(12) United States Patent
Trent et al.

(10) Patent No.: US 9,657,783 B2
(45) Date of Patent: May 23, 2017

(54) WET FRICTION CLUTCH

(71) Applicant: Ford Global Technologies, LLC, Southfield, MI (US)

(72) Inventors: Matthew Thomas Trent, South Lyon, MI (US); George Frederick MacDonald, West Bloomfield, MI (US); Bryant David Grytzelius, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 14/600,574

(22) Filed: Jan. 20, 2015

(65) Prior Publication Data

US 2015/0226273 A1  Aug. 13, 2015

Related U.S. Application Data

(60) Provisional application No. 61/939,405, filed on Feb. 13, 2014.

(51) Int. Cl.
  *F16D 25/0638* (2006.01)
  *F16D 25/10* (2006.01)
  *F16D 25/12* (2006.01)
  *F16D 13/74* (2006.01)
  *F16D 21/06* (2006.01)
  *F16D 13/70* (2006.01)

(52) U.S. Cl.
  CPC ............. *F16D 13/74* (2013.01); *F16D 13/70* (2013.01); *F16D 21/06* (2013.01); *F16D 25/0638* (2013.01); *F16D 25/123* (2013.01); *F16D 2021/0661* (2013.01); *F16D 2300/22* (2013.01)

(58) Field of Classification Search
  CPC .... F16D 25/123; F16D 25/0638; F16D 13/70; F16D 13/72; F16D 13/74; F16D 21/06; F16D 2021/0661
  See application file for complete search history.

(56) References Cited

U.S. PATENT DOCUMENTS

| 3,482,668 | A | * | 12/1969 | Hilpert | ................ F16D 25/0638 192/107 R |
| 5,794,751 | A | * | 8/1998 | Kerendian | .......... F16D 25/0638 192/85.42 |
| 6,755,291 | B2 | | 6/2004 | Hirota | |
| 8,101,286 | B2 | | 1/2012 | Tung | |
| 8,317,005 | B2 | | 11/2012 | Soller et al. | |
| 8,727,093 | B2 | | 5/2014 | Maerkl et al. | |
| 2012/0241278 | A1 | * | 9/2012 | Absenger | ................ F16D 21/06 192/48.619 |

* cited by examiner

*Primary Examiner* — Richard Lorence
(74) *Attorney, Agent, or Firm* — James Dottavio; Brooks Kushman P.C.

(57) ABSTRACT

A clutch module for a dual clutch transmission (DCT) is designed to improve circumferential fluid distribution to reduce or eliminate an unpleasant noise during engagement. In some embodiments, the reaction plate is restrained in a position offset 1-3 degrees from perpendicular to the housing axis. Consequently, 0.2-0.7 mm of clearance remains on one radial side of the clutch when all clearance has been removed on the other radial side of the clutch. Relative rotation between the hub and the housing pushes fluid from the tight side toward the loose side. In an alternative embodiment, the piston is designed to orient the pressure plate non-perpendicular to the housing axis.

16 Claims, 4 Drawing Sheets

WET FRICTION CLUTCH

CROSS-REFERENCE TO RELATED APPLICATIONS

This application claims the benefit of U.S. provisional application Ser. No. 61/939,405 filed Feb. 13, 2014, the disclosure of which is hereby incorporated in its entirety by reference herein.

TECHNICAL FIELD

The present disclosure relates to the field of wet friction clutches as used in automotive transmissions. In particular, the disclosure relates to design features to improve distribution of fluid.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

In some types of transmissions, a gear ratio between the input shaft and the output shaft is established by engaging one or more friction clutches. During some operating conditions, a clutch may be partially engaged such that it transmits torque between two elements that are rotating at different speeds or between a rotating element and a stationary element such as the transmission housing. For example, during an upshift, the oncoming clutch may be partially engaged while the engine speed gradually declines to the speed associated with the final gear, enabling the transmission to provide output torque during the shift event. As another example, a clutch may be partially engaged while the vehicle accelerates from stationary to the speed associated with complete engagement of first gear. When a clutch is partially engaged, power is converted into heat which must be absorbed by the clutch and eventually dissipated.

A common type of clutch utilizes a clutch pack having separator plates splined to a rotating housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. Fluid typically flows between the separator plates and friction plates keeping the friction material on each friction plate damp. Heat is generated at the interface when the clutch is partially engaged. The heat is absorbed by the separator plates and transferred to the fluid by convection and is removed from the clutch with the fluid.

SUMMARY

A clutch module includes a plurality of friction plates splined to a hub and a plurality of separator plates splined to a clutch housing. The housing includes passageways directing fluid to the area between the friction plates and separator plates. At least one of the separator plates is not oriented perpendicular to the clutch housing axis. Consequently, as the clutch is applied, fluid is distributed circumferentially across the friction plates. The clutch module may also include a second clutch.

A wet multi-plate friction clutch includes a clutch housing, separator plates splined to the housing, friction plates interleaved with the separator plates, and a piston that compressed the friction plates between the separator plates. The clutch is designed such that when movement of the piston has removed all of the clearance between friction plates and separator plates on one radial side, a positive clearance remains on the other radial side. For example, the reaction plate may be restrained in an orientation offset from the housing axis by 1-2 degrees, resulting in 0.2-0.7 mm of clearance on one side when the clearance has been removed on the other side. Alternatively or additionally, the piston may be designed to offset the pressure plate from perpendicular to the housing axis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
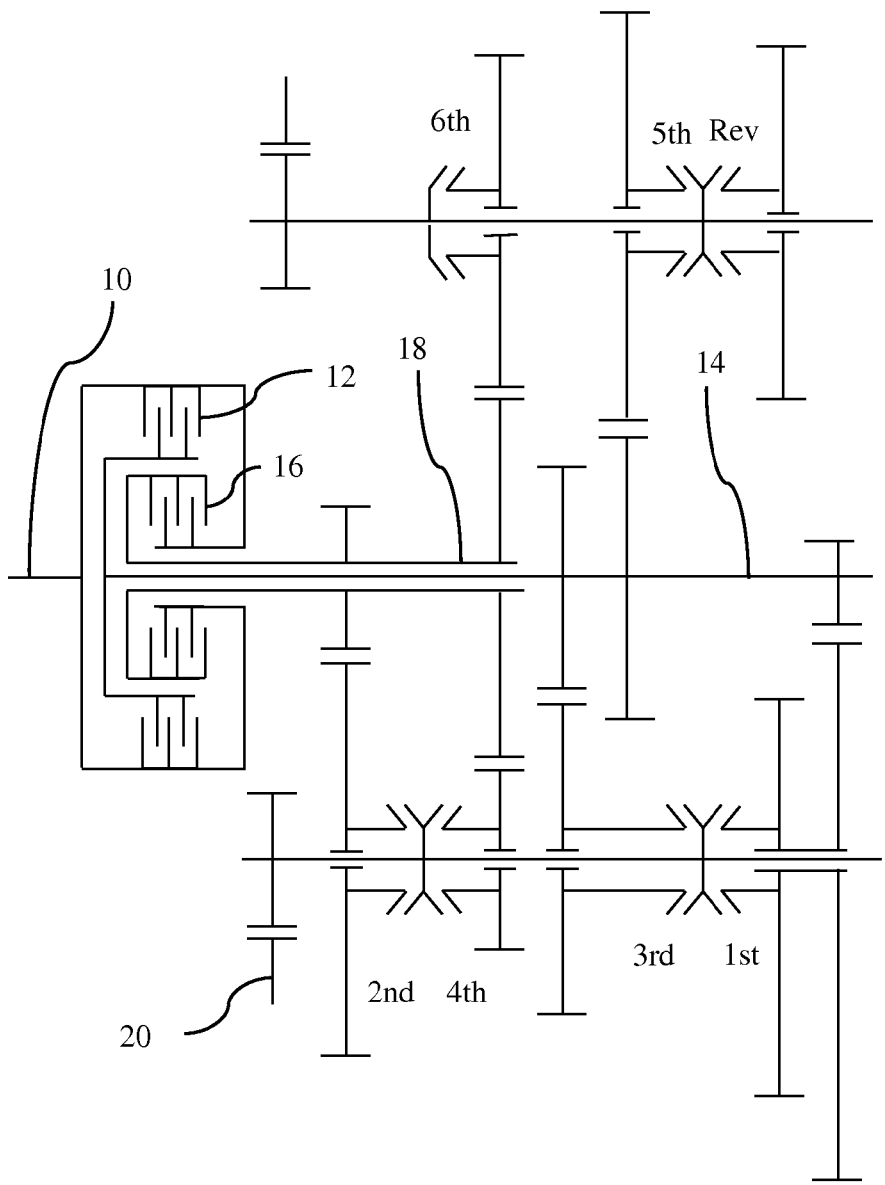
FIG. 1 is a schematic diagram of a dual clutch transmission.

FIG. 1 schematically illustrates a dual clutch transaxle (DCT) which is a type of transmission that may utilize a wet friction clutch according to the invention. Other types of transmissions may also utilize a clutch according to the invention. An input 10 is driveably connected to the engine crankshaft. Odd clutch 12 selectively couples input 10 to solid clutched shaft 14. Even clutch 16 selectively couples input 10 hollow clutched shaft 18. The odd gear ratios, (1st, 3rd, 5th, and reverse) are established by a set of synchronizers which establish torque paths between solid clutched shaft 14 and the transaxle output 20 at various speed ratios. Similarly, another set of synchronizers establish torque paths between the hollow clutched shaft 18 and output 20 at speed ratios corresponding to even gear ratios (2nd, 4th, and 6th). Output 20 is driveably connected to left and right front wheels through a differential.

When the vehicle is stationary, clutches 12 and 16 are both disengaged. To launch the vehicle in a forward direction, the synchronizer corresponding to 1st gear is engaged and then odd clutch 12 is gradually engaged. During the launch event, solid clutched shaft 14 is rotating slower than input shaft 10 such that there is slip across clutch 12. The power transmitted to clutched shaft 14 is less than the power input from input 10. The remaining power is converted into heat. This heat causes the temperature of the clutch to increase until the heat can be dissipated. The synchronizer for 2nd gear may also be engaged. During a heavy throttle launch, the clutch 16 may be partially engaged in order to transfer some of the input torque. Although the power flow path associated with 2nd gear provides less torque multiplication than the power flow path associated with 1st gear, dividing the power between these two paths reduces the heating of clutch 12.

While the vehicle is running in 1st gear, even clutch 16 is disengaged. To shift from 1st to 2nd, the synchronizer for 2nd gear is engaged (if it wasn't already engaged) and then even clutch 16 is gradually engaged while odd clutch 12 is gradually released. Specifically, during a torque transfer phase of an upshift, the torque capacity of the off-going clutch is gradually reduced to zero while the torque capacity of the on-coming clutch is increased, transferring power from the power flow path associated with the initial gear ratio to the power flow path associated with the upshifted gear ratio. Then, during an inertia phase, the torque capacity of the on-coming clutch is increased to a level that exceeds the engine torque in order to slow the engine to the upshifted speed ratio. During both of these phases, the on-coming clutch is slipping and, therefore, absorb heat. Similarly, to shift from 2nd to 3rd, the synchronizer for 3rd gear is engaged and then odd clutch 12 is gradually engaged while even clutch 16 is gradually released. Additional shifts are accomplished similarly.

During a power-on downshift, the order of the inertia phase and the torque transfer phase are reversed. During the inertia phase, the torque capacity of the off-going clutch is reduced to a level less than the engine torque such that the engine will accelerate to the downshifted speed ratio. As the speed ratio approaches the downshifted speed ratio, the torque capacity of the off-going clutch may be increased to avoid overshooting the ratio. During the inertia phase, power is transferred via the power flow path associated with the initial gear ratio. Then, during the torque transfer phase, the torque capacity of the on-coming clutch is increased while the torque capacity of the off-going clutch is reduced to zero, transferring power from the power flow path of the initial gear to that of the downshifted gear. During the downshift, the off-going clutch is slipping, so it must absorb heat.

Figure 2:
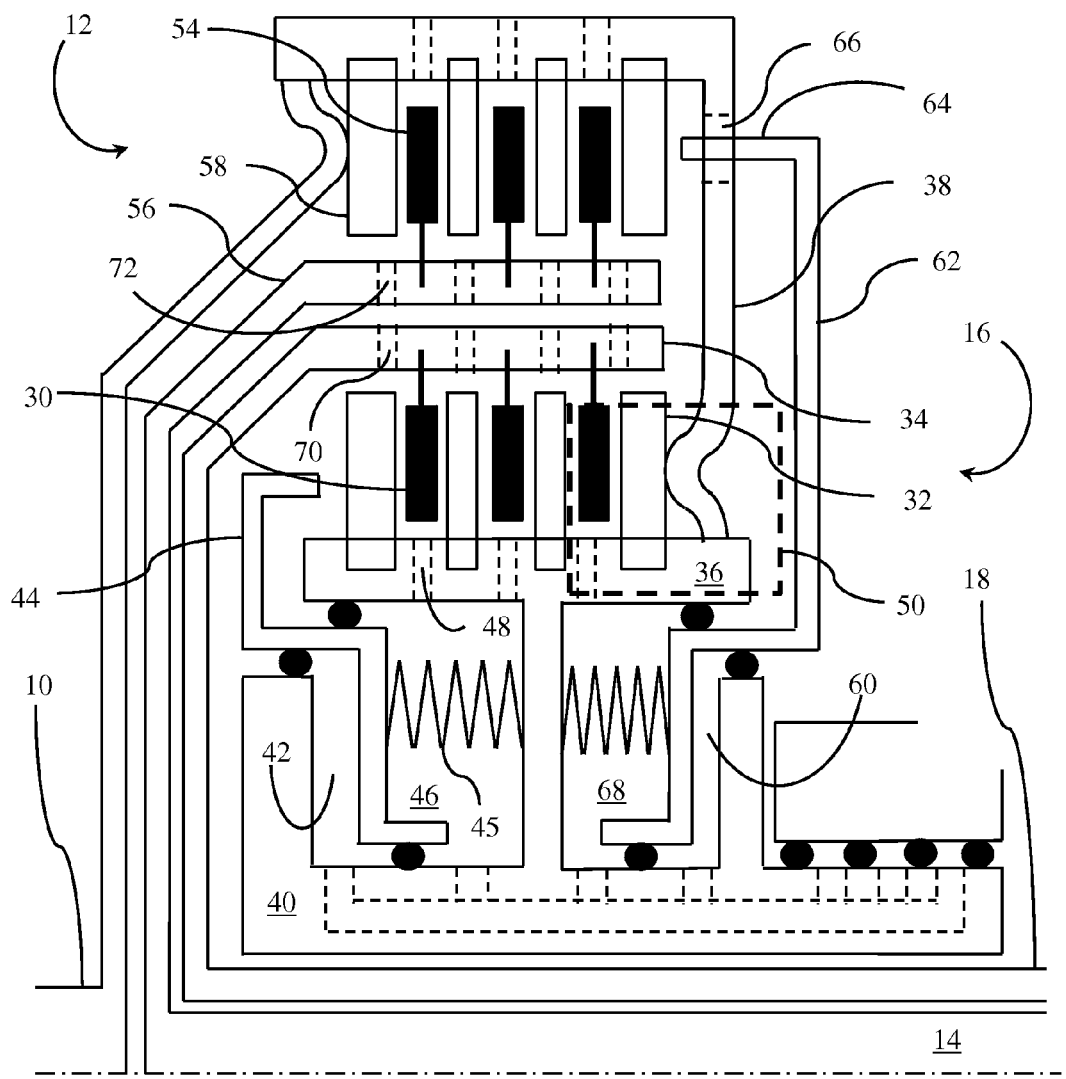
FIG. 2 is a cross sectional view of a two clutch module suitable for use in the transmission of FIG. 1.

FIG. 2 shows a cross section of a wet two clutch module. The clutch pack for even clutch 16 includes a number of friction plates 30 interleaved with a number of separator plates 32. FIG. 2 shows three friction plates and four separator plates, but the number may vary. The separator plate on one end of the clutch pack is restrained from axial movement and is called a reaction plate. In clutch 16, the reaction plate is restrained axially by shell 38. The reaction plate on the other end of the clutch pack is called the pressure plate. The friction plates 30 are splined to hub 34 which is fixed to rotate with the hollow clutched shaft 18. The spline connection allows relative axial movement but very little relative rotation between the friction plates 30 and hub 34. In practice, it may be impractical to eliminate all relative rotation. The amount of relative rotation associated with a spline connection is called the spline lash. Similarly, the separator plates are splined to hub 36 which is fixed to input 10 by shell 38. Hub 36 is also fixed to housing 40.

To engage even clutch 16, pressurized fluid is forced from a valve body into housing 40 and then into apply chamber 42. The fluid forces piston 44 to move to the right squeezing the clutch pack between piston 44 and shell 38. To release clutch 16, the pressure of the fluid routed to apply chamber 42 is reduced. Return spring 45 then pushes piston 44 to the left relieving the normal forces between friction plates 30 and pressure plates 32. When the hub 36/housing 40 assembly rotates in response to engine rotation, centrifugal forces acting on the fluid in apply chamber 42 increase the pressure above the level commanded within the valve body. This effect can make control of the torque capacity difficult and can even cause the clutch to engage when commanded to release. To alleviate this phenomenon, fluid at very low pressure is supplied to balance chamber 46 on the opposite side of piston 44. The radius and area of this balance chamber is designed to be very close to the radius and area of the apply chamber such that centrifugal forces acting on the fluid in the balance chamber counteract centrifugal forces acting on the fluid in the apply chamber.

Each side of each friction plate 30 is covered with friction material that is specially formulated to have desirable friction properties when it is saturated with fluid. In particular, the dynamic coefficient of friction when there is relative rotation is very close to the static coefficient of friction when there is no relative rotation. This characteristic helps to avoid a stick-slip phenomenon during transition between states with relative rotation and states in which the friction plates and separator plates rotate as a unit. Among the adverse effects of the stick-slip phenomenon is the generation of noise.

In order to maintain the desirable friction characteristics, it is important to keep the friction material saturated with fluid. It is also important to keep fluid flowing past the friction surfaces in order to remove heat. This fluid is provided by forming passageways 48 in hub 36 to allow fluid to flow from balance chamber 46 into the clutch pack. However, it is difficult to ensure that all parts of every friction plate are exposed to this flow. If some areas are not exposed to the flow, then there may be dry spots with different friction characteristics than the saturated areas.

Figure 3:
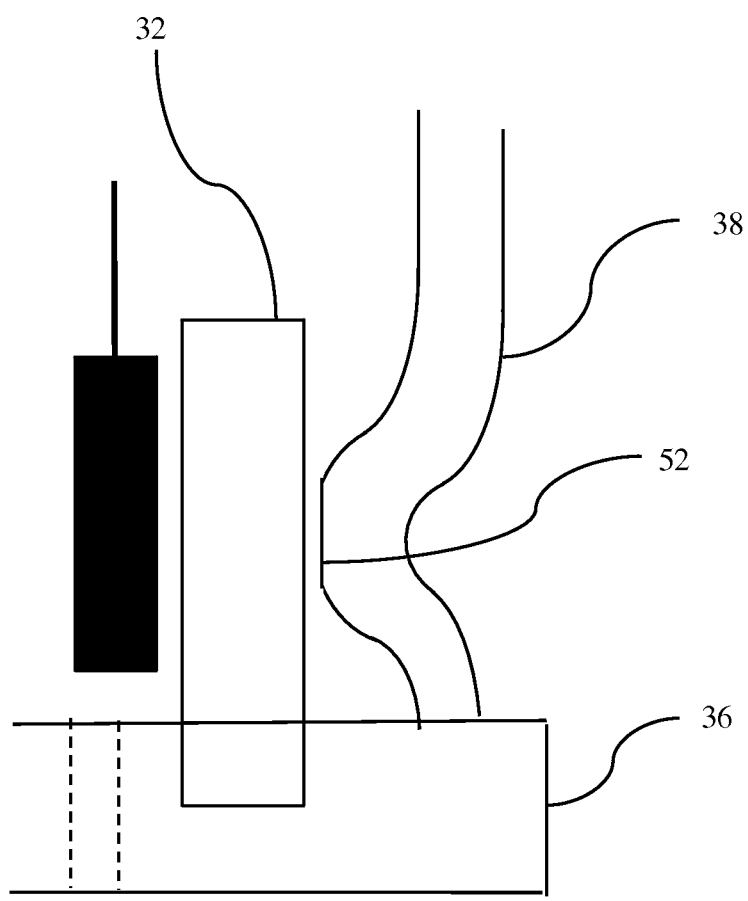
FIG. 3 is an enlarged cross sectional view of a portion of the two clutch module of FIG. 2.
Figure 4:
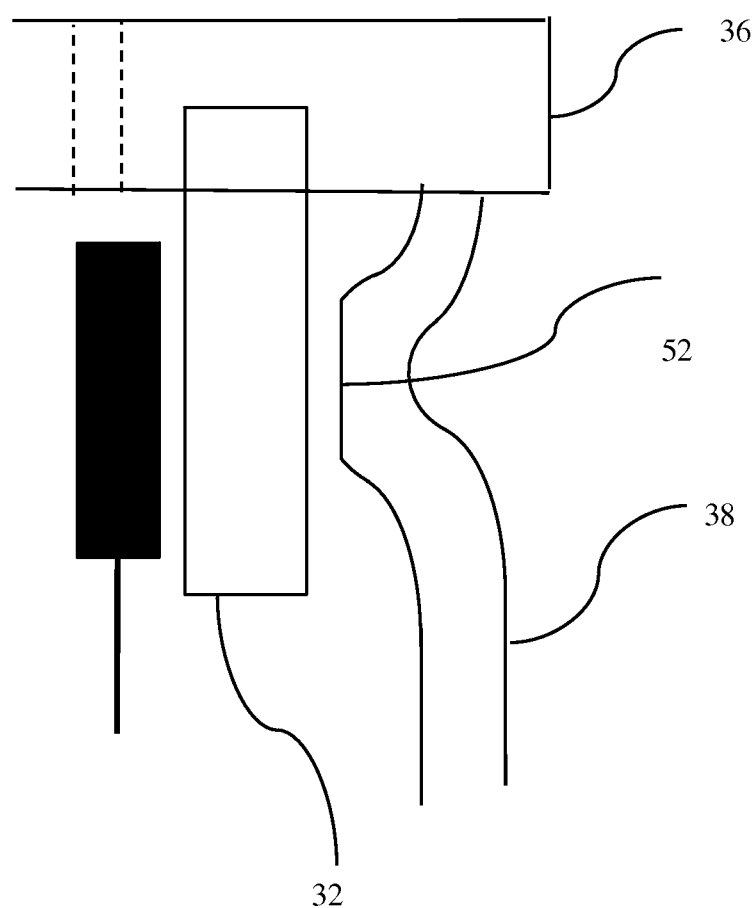
FIG. 4 is a cross sectional view of a corresponding portion of the two clutch module at a different circumferential position.

FIG. 3 shows an expanded view of the region 50 in FIG. 2. As shown at 52, a flat surface is machined onto shell 38 where it interfaces with reaction plate 32. FIG. 4 shows the same region on the opposite radial side of the clutch module (bottom as opposed to top). The machined surface is slightly offset, in the range of 1 to 3 degrees, from being perpendicular to the clutch centerline. As a result, there is slightly more clearance, in the range of 0.2-0.7 mm, between separator plates and friction plates on one side than on the other side. The clearance is the sum of the axial distances between each friction plate surface and the adjacent separator plate surface. As a consequence, when the clutch is engaged, one side of the clutch is slightly tighter than the opposite side of the clutch. The fluid is squeezed out of the friction material on the tighter side. When there is relative rotation between the separator plates and the friction plates, the separator plates push the fluid circumferentially distributing it around the friction plates and reducing the likelihood of dry spots.

The applicants have determined empirically that the angular offset and the resulting difference in clearance strongly influences various functional characteristics of the clutch. When the offset is insufficient, noise is generated during certain maneuvers which involve clutch slip. Specifically, noise is generated during launches that utilize clutch 16, during power-on upshifts in which clutch 16 is the oncoming clutch, and during power-on downshifts in which clutch 16 is the off-going clutch. When the offset is excessive, applying the clutch may exert radial forces on the friction plates causing the hub to move radially. The resulting imbalance may result in vibration noticeable to vehicle occupants. It may also result in the torque capacity varying slightly as a function of the rotational position of the hub relative to the housing, producing an oscillating transmission output torque.

Clutch 12 is structured and functions similarly to clutch 16, but with some differences. The clutch pack for clutch 12 is radially outside the clutch pack for clutch 16. Friction plates 54 are splined to hub 56 which is fixed to solid clutched shaft 14. Separator plates 58 are splined to shell 38 which, as discussed above, is fixed to input shaft 10. To engage clutch 12, pressurized fluid is routed to apply chamber 60, forcing piston 62 toward the left. A number of fingers 64 of piston 62 reach through a number of holes 66 in shell 38 such that piston 62 can apply force to the pressure plate. Unpressurized fluid if provided to balance chamber 68.

Fluid is provided to the clutch pack via passageways 70 in hub 34 and passageways 72 in hub 56. In order to ensure that the fluid is distributed circumferentially, the fingers 64 of piston 62 may be slightly longer on one radial side than on the other radial side. Like the angular offset of the reaction plate of clutch 16, this has the effect of providing 0.2-0.7 mm more clearance on one side than on the other. Relative rotation between shell 38 and hub 56 distributes the fluid from the tighter side to the looser side. Other embodiments may accomplish the uneven squeezing other ways. For example, one or more separator plates may have slightly different thickness on one radial side than on the opposite radial side.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A clutch module comprising:
a first hub;
a first plurality of friction plates splined to the first hub;
a clutch housing defining a convex cylindrical surface and defining a number of first passageways to direct fluid to the convex cylindrical surface; and
a first plurality of separator plates interleaved with the friction plates and splined to the convex cylindrical surface, at least one of the separator plates not oriented perpendicular to the cylindrical surface such that relative rotation of the hub and the housing distribute the fluid circumferentially across the friction plates.

2. The clutch module of claim 1 wherein the at least one separator plate that is not oriented perpendicular to the cylindrical surface is a reaction plate.

3. The clutch module of claim 1 further comprising:
a second hub;
a second plurality of friction plates splined to the second hub;
a shell fixed to the housing and defining a concave cylindrical surface; and
a second plurality of separator plates splined to the concave cylindrical surface.

4. The clutch module of claim 3 wherein:
the first hub and the second hub define third passageways and fourth passageways respectively to direct fluid to the second friction plates; and
at least one of the separator plates of the second plurality of separator plates is not oriented perpendicular to the concave cylindrical surface such that relative rotation of the second hub and the shell distribute the fluid circumferentially across the second friction plates.

5. The clutch module of claim 4 wherein the at least one separator plate of the second plurality of separator plates is a pressure plate.

6. A wet multi-plate friction clutch comprising:
a clutch housing having a first radial side and a second radial side;
a plurality of separator plates splined to the housing, including a pressure plate and including a reaction plate restrained from axial movement with respect to the housing;
a plurality of friction plates interleaved with the separator plates; and
a piston configured to move axially with respect to the housing to push the pressure plate toward the reaction plate, a contact surface between the piston and the pressure plate offset from parallel to a contact surface between the clutch housing and the reaction plate such that, when all the friction plates have been forced into contact with separator plates on the first radial side, a positive clearance between friction plates and separator plates remains on the second radial side.

7. The clutch of claim 6 wherein the positive clearance is between 0.2 mm and 0.7 mm.

8. The clutch of claim 6 wherein:
the housing defines a housing axis; and
the reaction plate is restrained to lie in a plane offset from perpendicular to the housing axis by a non-zero angle.

9. The clutch of claim 8 wherein the angle is between 1 degree and 3 degrees.

10. The clutch of claim 6 wherein:
the housing defines a housing axis; and
the piston is configured to contact the pressure plate along a plane that is offset from perpendicular to the housing axis by a non-zero angle.

11. The clutch of claim 10 wherein the angle is between 1 degree and 3 degrees.

12. A clutch module comprising:
a housing defining a housing axis;
a first plurality of separator plates splined to the housing, including a reaction plate; and
a shell fixed to the housing and having a machined surface to orient the reaction plate to an orientation offset from perpendicular to the housing axis by a non-zero angle.

13. The clutch module of claim 12 wherein the angle is between 1 degree and 3 degrees.

14. The clutch module of claim 12 further comprising:
a first hub;
a first plurality of friction plates splined to the first hub and interleaved with the first plurality of separator plates; and
a first piston configured to move along the housing axis to compress the friction plates between the separator plates.

15. The clutch module of claim 14 wherein, with the piston positioned to force all the friction plates into contact with separator plates on a first radial side of the housing, between 0.2 mm and 0.7 mm of clearance between friction plates and separator plates remains on an opposite radial side of the housing.

16. The clutch module of claim 14 further comprising:
a second plurality of separator plates splined to the shell;
a second hub;
a second plurality of friction plates splined to the second hub and interleaved with the second plurality of separator plates; and
a second piston configured to move along the housing axis to compress the second friction plates between the second separator plates.

* * * * *